Feb. 12, 1963    H. KITZROW    3,077,274
SUPPLY APPARATUS FOR SHAFT FURNACES AND THE LIKE
Filed Sept. 6, 1960    3 Sheets-Sheet 1

Inventor:
Herbert Kitzrow
by Michael S. Striker
Attorney

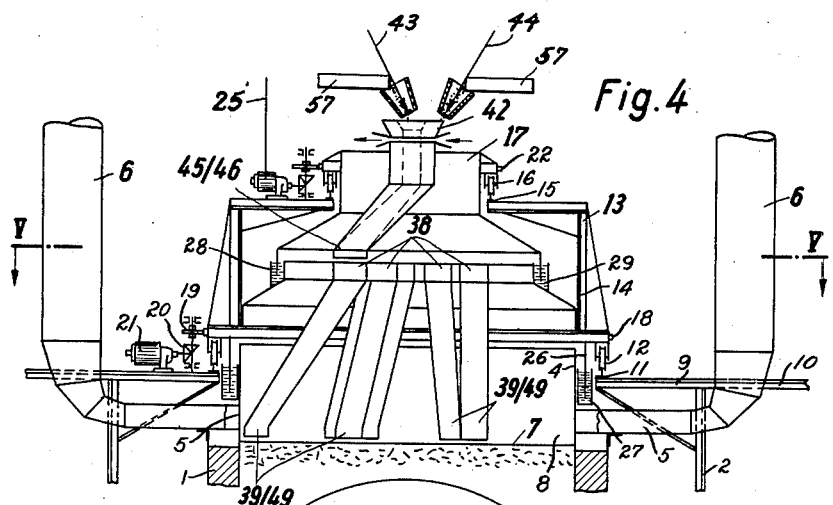
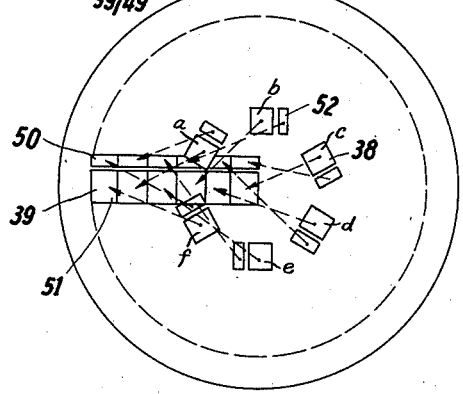
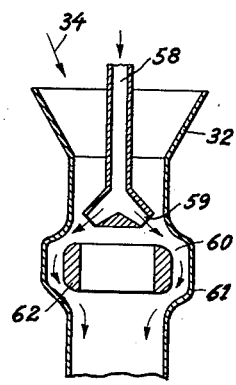
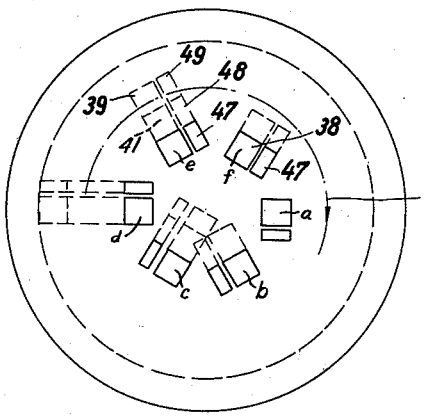

Feb. 12, 1963   H. KITZROW   3,077,274
SUPPLY APPARATUS FOR SHAFT FURNACES AND THE LIKE
Filed Sept. 6, 1960   3 Sheets-Sheet 3

INVENTOR.
Herbert Kitzrow
BY Michael S. Striker
Attorney

United States Patent Office 3,077,274
Patented Feb. 12, 1963

3,077,274
SUPPLY APPARATUS FOR SHAFT FURNACES AND THE LIKE
Herbert Kitzrow, Wulfrath, Germany, assignor to Rheinische Kalksteinwerke G.m.b.H., Wulfrath, Germany
Filed Sept. 6, 1960, Ser. No. 54,115
Claims priority, application Germany Sept. 7, 1959
12 Claims. (Cl. 214—35)

The present invention relates to shaft furnaces such as blast furnaces, lime kilns, and the like.

More particularly, the present invention relates to apparatus for supplying materials to any hollow shafts wherein the material which is treated continuously moves down the shaft while the surface of the treated material is to be maintained at a substantially constant elevation. For example, the supply apparatus of the invention may be used in silos, drying shafts, gas generators, or the like, but the structure of the invention is particularly suitable for shaft furnaces such as blast furnaces, lime kilns, and the like.

With this latter type of structure there is not only the problem of maintaining the surface of the treated material at a substantially constant elevation, but in addition there is the problem of maintaining the several ingredients of the material supplied at a predetermined ratio with respect to each other.

Thus, one of the objects of the present invention is to provide a shaft furnace or the like with a supply apparatus capable of maintaining the several materials supplied in a predetermined ratio with respect to each other while at the same time capable of maintaining the surface of the treated material at a substantially constant elevation.

Another object of the present invention is to provide a supply apparatus which does not have any sensitive mechanical elements located at an interior region where they can be undesirably acted upon by the high temperatures, gases, and the like prevailing in the interior of a shaft furnace or the like. Thus, the structure of the invention is capable of being used without any difficulty with shaft furnaces which have a gas discharged therefrom at a temperature of up to approximately 350° C. and which have in their interior a pressure of, for example, 250 mm. of water.

It is also an object of the present invention to provide a supply apparatus which will distribute to the interior of a shaft furnace or the like materials which are delivered in such a way that they cannot be drawn out of the furnace with the gas which is discharged therefrom.

Another object of the present invention is to provide a supply apparatus of the above type which is capable of uniformly distributing the materials over the entire cross-sectional area of the shaft furnace or the like.

An additional object of the present invention is to provide a supply apparatus of the above type which is capable of supplying materials to the interior of a furnace whose interior is at an elevated pressure while at the same time reliably preventing the gas under pressure from escaping from the interior of the furnace through the supply apparatus itself.

With the above objects in view the present invention includes, in a shaft furnace such as a blast furnace, lime kiln, or the like, an upper furnace portion having a vertical axis and having an inner predetermined circular area in a plane normal to this vertical axis. A rotary supply means is coaxial with and located above the upper furnace portion and includes a rotary supply duct having a lower outlet end describing, during rotation of the rotary supply means, a predetermined circle whose center is in the vertical axis of the upper furnace portion. A rotary distributor means is coaxial with and located between the supply means and the upper furnace portion, and this rotary distributor means includes a plurality of distributor ducts which rotate with the rotary distributor means, which have inlet ends respectively distributed along the above predetermined circle to receive material from the supply duct, and which have above but relatively close to the above-mentioned plane discharge ends respectively located at different radial distances from the above vertical axis and respectively having radial dimensions whose total is substantially equal to the radius of the circular area referred to above divided by the number of discharge ducts. The discharge ends of the distributor ducts will thus describe, during each revolution of the rotary distributor means, an area substantially equal to the above-mentioned predetermined circular area of the upper furnace portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a fragmentary schematic elevation of another embodiment of a supply apparatus according to the invention;

FIG. 5 is a schematic plan view taken along line V—V of FIG. 4 in the direction of the arrows;

FIG. 6 is a plan view corresponding to FIG. 5 but showing another embodiment of a distributor duct arrangement;

FIG. 7 is a fragmentary sectional elevation schematically illustrating a gas curtain;

Figure 1:
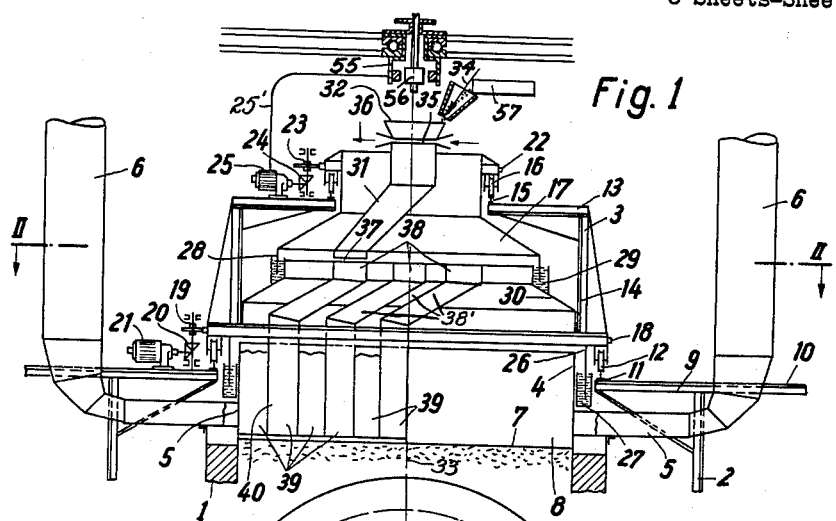
FIG. 1 is a schematic elevation of one possible apparatus constructed in accordance with the present invention.

Referring now to FIG. 1, there is illustrated therein in a fragmentary transverse sectional view the upper portion 1 of a furnace such as a blast furnace, lime kiln, or the like. This upper portion 1 of the furnace is circular and is surrounded by an exterior framework 2. The supply apparatus of the invention is carried by and extends upwardly from the upper portion of the furnace. The entire supply aparatus of the invention is indicated by the reference character 3. The upper furnace portion 1 has an upper end 4 and a discharge conduit means 5 in the form of a plurality of conduits communicating with the interior of the furnace at its upper end 4 which serve to convey gases from the interior portion 8 of the furnace through the several discharge conduits 5 to the conduits 6 which respectively form continuations of the conduits 5. FIG. 1 illustrates at 7 the surface of the materials treated in the furnace, and as has already been pointed out above this surface is to be maintained at a substantially constant elevation.

The outer framework 2 of the furnace terminates at its upper end in a supporting structure 9 which carries the inner portion of the annular charging platform 10. At its inner peripheral portion the supporting structure 9 carries an annular rail 11 engaged by a plurality of rolls 12 which are distributed along a circle and which are carried by a framework of a rotary distributor means 13. In this way the rotary distributor means 13 is supported through the rolls 12 and the circular rail 11 for rotation about the vertical axis of the upper furnace portion 1, 4, this rotary distributor means 13 being coaxial with the upper furnace portion 1, 4. The rotary distributor means 13 has an upper platform carried by the framework 14, and this upper platform itself carries an annular rail 15 engaged by a plurality of rolls 16 which are carried by a rotary supply means 17, this supply means 17 being coaxial with the rotary distributor means 13 and being supported by way of the rolls 16 and rail 15 for rotary movement with respect to the rotary distributor means 13.

The rotary distributor means 13 fixedly carries at its exterior a ring gear 18 which meshes with a pinion 19 supported by any suitable stationary bearings for rotation about its axis, and the shaft which carries the pinion 19 also carries one of a pair of bevel gears 20, the other of the bevel gears 20 being driven from an electric motor 21. As is apparent from FIG. 1, the drive means 19—21 which cooperates with the gear 18 for turning the rotary distributor means 13 is carried by the upper supporting structure 9 of the framework 2. The driving motor 21 is supplied from any suitable source of current.

In much the same way the rotary supply means 17 fixedly carries a ring gear 22 which meshes with a pinion 23 supported for rotation by suitable bearings carried by the upper part of the rotary distributor means 13, and the shaft which carries the pinion 23 carries a bevel gear 24 which meshes with a second bevel gear 24 driven from the motor 25 which is carried by the upper part of the rotary distributor means 13. This motor 25 is supplied with current through conduit 25', contacts 55 and slip rings 56 inasmuch as the entire turning means 22—25 which serves to turn the rotary supply means 17 is itself carried by the rotary distributor means 13 and turns therewith.

The ring gear 18 which is fixed to the rotary distributor means 13 is directly carried by an annular plate which is coaxial with the upper furnace portion 1, 4, this annular plate having an inner periphery of a diameter somewhat smaller than the diameter of the upper end 4 of the upper furnace portion 1, 4. The rotary distributor means 13 includes within the framework 14 a hood portion having upper and lower cylindrical parts interconnected by a frustoconical section 30, as shown in FIG. 1, the lower cylindrical part being fixed fluid-tightly to the annular plate which carries the gear 18. Fixed to and depending from this latter plate which carries the gear 18 is a cylindrical member 26 coaxial with the upper furnace portion 1, 4, fixed fluid-tightly to the underside of the annular plate which carries the gear 18, and having its bottom peripheral portion located in the interior of an annular channel 27 carried by the upper end 4 of the furnace surrounding this upper end and provided in its interior with a liquid of substantially constant temperature such as, for example, silicone oil. Inasmuch as the lower end portion of the cylindrical member 26 is immersed in this oil within the channel 27, a fluid-tight connection is provided between the rotary distributor means 13 and the upper furnace portion 1, 4 while freeing the rotary distributor means 13 for rotary movement with respect to the upper furnace portion 1, 4.

The ring gear 22 is fixed to an annular member which is fixed at its inner periphery to an upper cylindrical portion of the rotary supply means 17, and this upper cylindrical portion of the rotary supply means 17 is connected through an intermediate frustoconical portion to a lower cylindrical portion 28 of the rotary supply means 17. This lower cylindrical portion 28 of the rotary supply means 17 extends into a channel 29 carried by the frustoconical portion 30 of the rotary distributor means 13, and this channel 29 contains a liquid such as silicone oil in which the lower end portion of the cylindrical part 28 is immersed, so that in this way a fluid-tight connection is also provided between the rotary distributor means 13 and the rotary supply means 17 while freeing the latter for rotary movement with respect to the distributor means 13. The gas seals provided in this way are capable of withstanding the pressures of approximately 250 mm. of water, such pressures prevailing at the interior portion 8 of the upper furnace portion 1, 4.

The rotary supply means 17 fixedly carries a supply duct 31 as indicated diagrammatically in FIG. 1, and this supply duct 31 of the rotary supply means 17 has an upper, substantially funnel-shaped inlet 32 which is concentric with the vertical axis 33 of the upper furnace portion 1, 4. The arrow 34 diagrammatically indicates the material which moves in the direction of the arrow 34 into the inlet end 32 of the supply duct 31 which rotates with and forms part of the supply means 17. The structure which delivers the material to the inlet end 32 of the supply duct 31 includes a means, for instance a weighing-machine, for automatically controlling the flow of material from a suitable storage bin or the like located at a suitable elevation from which the material can flow to the inlet end 32 of the duct 31.

As is apparent from the above description, the gas in the interior upper part 8 of the furnace will also collect within the hollow interior of the rotary distributor means 13 as well as within the hollow interior of the rotary supply means 17. It should be noted that the upper cylindrical wall of the supply means 17 is provided with a top wall surrounding and fluid-tightly connected with the duct 31 at an elevation somewhat lower than its upper inlet 32, as indicated in FIG. 1, so that the gas in the interior of the supply means 17 and the distributor means 13 cannot escape and must flow through the discharge conduit means 5. However, there is a possibility that gas might escape through the supply duct 31 which has an open bottom outlet end as described below, and in order to prevent escape of the gas through the supply duct 31 a suitable lock arrangement may be provided in the form of a pair of slide valves or the like which are adapted to be opened alternatively so as to permit the material to flow through the duct while at the same time preventing gas from escaping therefrom. Such lock assemblies are of course well-known.

Instead of such a lock assembly, the structure of the invention includes a gas curtain forming device which is preferred to a lock assembly. The duct 31 will have its narrowest portion located immediately below the upper funnel-shaped inlet 32, and at this narrowest portion a gas-curtain forming means 35 is provided as indicated diagrammatically in FIG. 1. The gas curtain which is formed extends across the interior of the duct 31 in a manner preventing gas from escaping from the interior thereof while at the same time permitting the solid materials to flow through the duct 31 into the furnace, so that in this way a much simpler means than the above-mentioned lock assembly is provided for preventing gas from escaping out of the duct 31 while permitting the materials to be supplied through the latter. The gas curtain 35 may be provided by the same gas which forms in the upper inner portion 8 of the furnace and which is discharged through the conduit means 5. Any suitable blowers, fans, or the like are provided for drawing the gas across the interior of the duct 31 as indicated by the arrows 36 so that in this way the stream of gas forms a curtain preventing escape of gas from the interior of the furnace. An example of said gas curtain is illustrated in FIG. 7. The curtain-gas is applied by a pipe 58 having an annular slot 59, whereby the gas stream is forced conically to slot 60 between the outer wall 61 of the duct 31 and the annular guiding plate 62.

As is indicated in FIG. 1, the supply duct 31 has a lower outlet end 37 which is spaced from the axis 33 and which is connected to the upper part of the supply duct 31 through an intermediate inclined duct portion, as indicated in FIG. 1. Thus, during turning of the rotary supply means 17 the lower outlet end 37 of the supply duct 31 will describe a predetermined circle.

In the illustrated example the rotary distributor means 13 includes six distributor ducts 38 which are fixedly carried by the rotary distributor means 13 and which form a part thereof so that these ducts 38 rotate with the distributor means 13. The supply duct 31 is fixed to the top wall of the supply means 17 and extends through this top wall as has been indicated above, and in the interior of the supply means 17 any suitable struts or the like may be used to reinforce the support of the duct 31. The upper end of the cylindrical member of the distributor means 13 which extends upwardly from the frustoconical member 30 is not provided with any transverse wall so that it surrounds an open space through which material may fall from the duct 31. The several distributor ducts 38 are fixedly carried by the plate which fixedly carries the ring gear 18, and also any desired bars, struts, or the like may be provided for further supporting the several ducts 38. Each of these ducts has an upper substantially vertical inlet 38 and a lower substantially vertical discharge portion terminating in a discharge end 39, and these upper and lower portions of each distributor duct 38 are interconnected by an inclined duct portion 38′, as indicated in FIG. 1.

Figure 2:
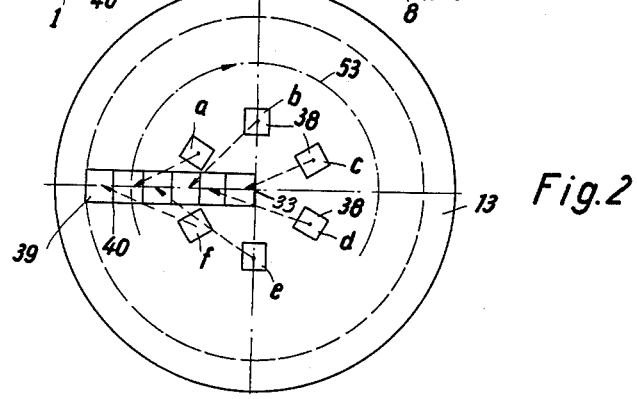
FIG. 2 is a plan view of the structure of FIG. 1 taken along line II—II of FIG. 1 in the direction of the arrows and showing schematically the arrangement of the distributor ducts of the structure of the invention.

The several upper inlet ends of the distributor ducts 38 are indicated in FIG. 2 diagrammatically at 38a–38f, and as is apparent from FIG. 2 these upper inlet ends of the several distributor ducts 38 are uniformly distributed along a circle whose center is in the axis 33. This circle is exactly the same as the circle described by the lower outlet end 37 of the supply duct 31 so that during rotation of the rotary supply means 17 its lower outlet end 37 will successively come into communication with the several inlet ends 38a–38f of the several supply ducts 38. The elongated vertical portions 40 of the several distributor ducts 38 are arranged one next to the other along a single radial line extending from the axis 33. Thus, all of the lower vertical portions 40 of the several distributor ducts 38 are located in a common radial plane one next to the other, and FIG. 2 illustrates in the dotted arrows the manner in which the inclined portions 38′ serve to interconnect the several upper inlet ends of the distributor duct 38 with their vertical portions 40 which terminate in the lower discharge ends 39. It will be noted that the several discharge ends 39 of the distributor ducts are respectively located at different radial distances from the axis 33, and moreover the radial dimension of each distributor duct at its discharge end 39 is equal to the radius of the circular area 8 divided by the number of distributor ducts. Thus, during rotation of the distributor means 13 the several discharge ends 39 of the distributor duct 38 will describe a circular area equal to the circular area of the surface 7 of the material in the furnace.

Although the ducts referred to in the above description are shown as being in the form of elongated tubes of rectangular cross-section, it is to be understood that any structures capable of conveying materials such as solids in particulate form may be used, and thus instead of elongated tubes it is possible to use chutes, any channels, or any other structures which will serve to convey the materials. The term "ducts" as used herein and in the claims which follow is intended to signify not only elongated tubes of any desired cross-sectional configuration but also channels, gutters, chutes, and the like.

Also, while the illustrated ducts have vertical and inclined portions, the vertical portions having less wear than the inclined portions although the latter provide a superior conveyance of the materials, it is also possible to provide ducts which are in the form of straight tubes, channels, chutes, or the like, such straight ducts being inclined so that in this way the total height of the entire assembly may be maintained at a minimum. Furthermore, it should be noted that it is immaterial from the standpoint of the present invention whether the structure is built onto the upper end portion of a shaft furnace or whether the structure is first built as a separate unit and then installed on the upper end portion of the shaft furnace.

Figure 3:
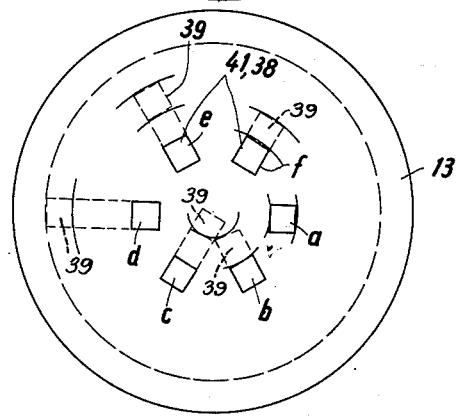
FIG. 3 is a plan view corresponding to that of FIG. 2 but showing another embodiment of an arrangement of distributor ducts.

As is apparent from the above description, where the elongated lower end portions 40 of the several distributor ducts 38 are arranged one next to the other in a common radial plane, it is necessary for the upper inlet ends 38a–38f to be connected with the several vertical portions 40 through the inclined duct portions 38′ which are required to extend in the manner indicated by the dotted arrows of FIG. 2. FIG. 3 shows another embodiment of the invention which is considerably simplified in this respect. Thus, in FIG. 3 the bottom discharge ends of the several distributor ducts are angularly displaced with respect to each other about the axis 33 of the furnace. Thus, FIG. 3 shows the discharge ends 39 angularly displaced. However, it will be noted that in this case also the several discharge ends 39 are located at different radial distances and each has a radial dimension equal to the radius of the area 7 divided by the number of discharge ducts, so that in the case of FIG. 3 the several discharge ends 39 will also describe during rotation of the distributor means 13 a circular area substantially equal to the surface area 7 of the material which is being treated. As is apparent from FIG. 3, the distributor ducts 41 of this embodiment are respectively located in radial planes. Thus, while the inlet ends 38a–38f of the several distributor ducts of FIG. 3 have the same arrangement as that illustrated in FIG. 2, the entire distributor ducts 41 are respectively located in the same radial planes as their inlet ends so that with this construction the distributor means is considerably simplified as compared to that of FIG. 2.

Instead of a single supply duct and one set of distributor ducts, it is possible to provide two or more supply ducts and two or more sets of distributor ducts respectively cooperating with the supply ducts so that different materials may be introduced through the several supply ducts and through the several sets of distributor ducts cooperating therewith. In FIG. 4 those parts which are the same as in FIG. 1 are designated with the same reference characters. The upper inlet end 42 of the supply ducts of the rotary supply means 17 of this embodiment includes a pair of concentric portions which are separate from each other and which form parts of a pair of separate supply ducts of this embodiment. Thus, the arrow 43 diagrammatically indicates delivery of one material to the innermost inlet end forming part of one supply duct, while the arrow 44 designates delivery of a second material to an outer annular inlet end concentric surrounding the inner inlet end of one of the supply ducts and this outer annular inlet end forms part of the second supply duct. These supply ducts are carried by the rotary supply means 17 in much the same way as the supply duct 31 described above, and the pair of supply ducts of the rotary supply means 17 of FIG. 4 are located next to each other and terminates in a pair of outlet ends 45 and 46 located one next to the other.

As is apparent from FIG. 5, the set of distributor ducts 41 of FIG. 3 are included in the embodiment of FIGS. 4 and 5. However, in addition to the set of distributor ducts 41, there is a second set of distributor ducts 48 respectively having the inlet ends 47 and the discharge ends 49. The inlet ends 47 are respectively located next to the inlet ends of the ducts 41 and have the same phase relation with respect thereto, while the discharge ends 48 are respectively located next to the discharge ends 39 of the ducts 41. It should be noted that the outlet ends 45 and 46 of the pair of supply ducts have the same cross-sectional areas as the inlet ends of the ducts 41 and 48 and exactly overlie each pair of adjacent inlet ends during rotation of the rotary supply means 17 with respect to the rotary distributor means 13 of the embodiment of FIGS. 4 and 5. Thus, each pair of ducts 41 and 48 located next to each other forms a unit through which a pair of different materials may be delivered.

While FIG. 5 shows how the duct system of the embodiment of FIG. 3 may be multiplied, FIG. 6 shows how the duct system of the embodiment of FIG. 2 may be modified. Thus, it will be seen from FIG. 6 that in addition to the ducts shown in FIG. 2 a second set of ducts is provided, this second set of ducts each having an inlet end 52 and a discharge end 50. The inlet ends 52 are located next to the inlet ends 38a–38f, while the discharge ends 50 are located next to the discharge ends 39, and each pair of ducts located beside each other forms a unit 51, as indicated in FIG. 6. Of course, suitable inclined duct portions, as indicated by the dotted arrows in FIG. 6, are provided to connect the inlet portions of the ducts with their discharge portions. The inlet ends shown in FIG. 6 have the same distribution as the inlet ends shown in FIG. 5, and thus they communicate in the same way with the supply means 17 of FIG. 4.

The above-described structure operates as follows:

Referring to FIG. 1, during operation of the blast furnace, for example, the rotary distributor means 13 is rotated at a uniform speed by the drive means 18–21. As is indicated by the arrow 34 a material is supplied to the inlet end 32 of the supply duct 31 during the operation, and this material is formed by a mixture of, for example, ore, coke, and limestone where the structure is applied to a blast furnace. These ingredients are mixed together in the proper proportions before being delivered to the inlet end 32 of the supply duct 31. Assuming that the outlet end 37 of the supply duct 31 is aligned with the inlet end 38a of the distributor duct which is next to the outermost distributor duct of FIGS. 1 and 2, it is clear that during the period while the outlet end 37 remains in alignment with the inlet end 38a, the material delivered through the distributor means will be spread along the circle 53 indicated in FIG. 2. The material is distributed in this way along the circle 53 during one or more revolutions of the rotary distributor means 13, until the material distributed along the circle 53 reaches a predetermined height which extends only to a relatively small extent above the surface 7. A sensing means in the form of a suitable feeler which is connected to the distributor means 13 for rotary movement therewith is engaged by the material on the surface 7 delivered by the next to the outermost duct in the above example, and this feeler when engaged by the material senses that the material has reached the prescribed height and actuates electrically a control apparatus which sets the motor 25 into operation so as to turn the rotary supply means 17 with respect to the turning distributor means 13, and in the illustrated example the electrical control structure automatically turns the supply means through an angle of 60 degrees so that the outlet end 37 of the duct 31 is now in alignment with the inlet end 38b of the supply duct shown diagrammatically in FIG. 2. Now the above operations repeat themselves, and in this way the material is distributed along annular areas which together total up to the entire circular area of the surface 7. Thus, when the material which passes through the inlet 38b has reached the prescribed height on the surface 7, as sensed by another feeler of the type described above, the electrical structure will act automatically so as to advance the outlet end 37 of the supply duct 31 into alignment with the inlet end 38c of the next distributor duct, and so on. All of the elongated end portions 40 of the distributor ducts which terminate in the discharge ends 39 carry the above-mentioned feelers, respectively, so that the several feelers respectively detect when the several circular or annular areas of material have reached the prescribed height so as to automatically actuate the motor 25 for advancing the outlet end 37 of the duct 31 to the next inlet of the next distributor duct.

Figure 8:
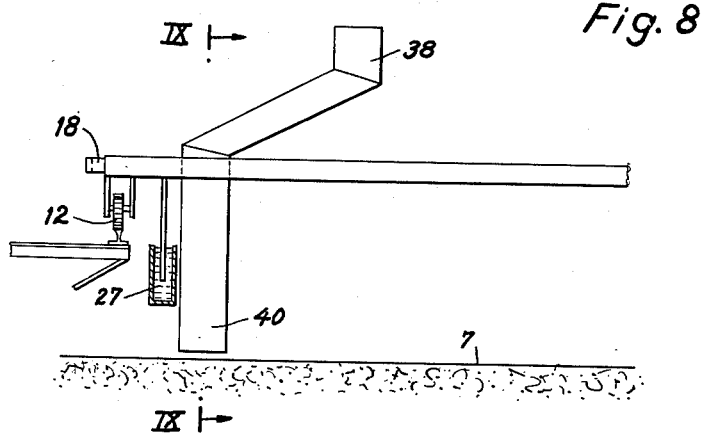
FIG. 8 is a sectional elevation of part of the structure.
Figure 9:
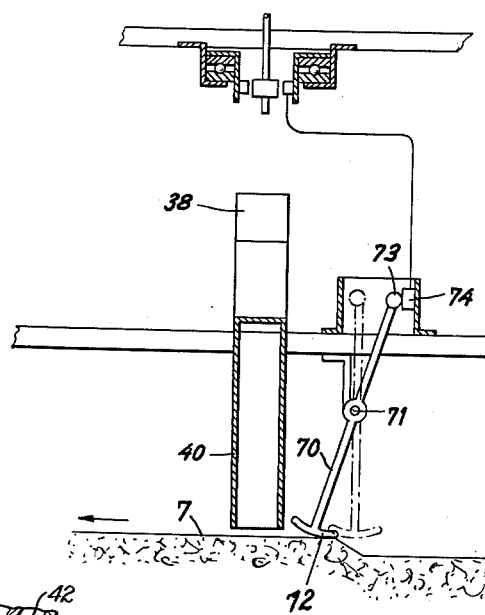
FIG. 9 is a section taken on line IX—IX of FIG. 8 showing a feeler arrangement.
Figure 10:
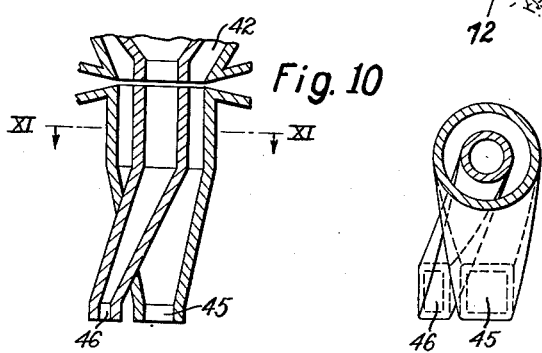
FIG. 10 is an enlarged sectional elevation rotated through 90° of the supply ducts shown in FIG. 4.
Figure 11:
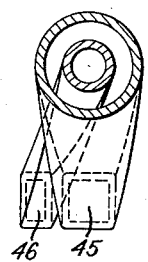
FIG. 11 is a section taken on line XI—XI of FIG. 10.

The feelers 70 are in detail illustrated in FIGS. 8 and 9, respectively. FIG. 8 is a part of FIG. 1 (left side) and FIG. 9 is a section along line IX—IX of FIG. 8. The feeler 70 is pivotally arranged at 71 and has at its lower end a shoe-like plate 72 and at its upper end an electrical contact 73 cooperating with a fixed contact 74. In the position shown in full lines in FIG. 9 the circular area beneath the discharge end 39 has been filled completely. Thereby the feeler 70 has been pivoted from the perpendicular position, which said feeler had in time before said circular area was filled. The perpendicular position is indicated in dotted lines. By giving connection between 73 and 74 the circuit is shut and the feeler is grounded at the surface 7. Thus, the motor 25 is energized so as to turn the rotary supply means 17 through 60 degrees.

Instead of using feelers for controlling the proper height of the level of the material, it is possible to control said height by means of the weighing-machine or machines 57 situated above the inlet end 32. For this purpose, the weighing machine 57 is operated in such a manner as to give equal weights in equal times. According to the different need of material in each circular area beneath the discharge ends 39, the rotary supply means 17 is caused to make a corresponding different number of revolutions to get the surface 7 uniformly in the furnace.

It should be noted that the arrangement of the distributor ducts shown in FIG. 2 will not only distribute the material over the entire surface area 7, but in addition this material will be distributed in such a way that substantially the same concentration of material remains at all times over all parts of the surface 7. Thus, it will be seen that after material is delivered along the circle 53, the material is then distributed not along an adjoining circle but rather along an inner circle spaced inwardly from the circle 53, and then the next inner circle is skipped so that the innermost area is supplied. Then the distribution takes place outwardly from the axis starting with the annular area which surrounds the innermost circular area and then skipping each annular area until the outermost annular area which surrounds the circle 53 is provided with material, and then this process repeats itself. Bearing in mind that the distributor means 13 rotates at a uniform speed, it will be seen that the distributor means 13 will turn through more revolutions to supply the outermost portions of the area 7 with material than the innermost portions thereof. Thus, while the innermost portion of the surface 7 is supplied with material immediately before the annular area which directly surrounds this innermost portion, it must be remembered that these inner portions are provided with material in a relatively short time because of their relatively small areas so that with the arrangement shown in FIG. 2 a substantially uniform concentration of material over the entire surface area 7 is maintained.

Although a suitable means may be provided for interrupting the flow of material through the supply duct 31 during the time when the outlet end 37 thereof is being moved by the motor 25 from the inlet end of one distributor duct to the inlet end of the next distributor duct, it is preferred simply to allow material to fall freely from the discharge or outlet end 37 of the supply duct 31 during the time that this duct is being turned from one position to the next. The drive means 22–25 is preferably designed so as to turn the supply means 17 very quickly from one position to the next so that due to the extremely short period of time required for the supply means 17 to turn through an angle of 60 degrees in the above-described example, only an extremely small amount of material will fall between the distributor ducts directly onto the surface 7, and this material which falls between the ducts is so small due to the rapid movement of the supply means 17 from one position to the next that it is negligible. With this arrangement the rate of flow of material to the inlet 32 as indicated by the arrow 34 can be maintained substantially constant at all times.

Instead of mixing together the various ingredients before they are delivered to the inlet 32 of the duct 31, it is possible to deliver these ingredients separately one after the other to the duct 31. Thus, for example, the material supplied along the circle 53 shown in FIG. 2 can be first a layer of ore, then a layer of coke, and finally a layer of limestone.

The structure of FIGS. 4–6 makes it possible to deliver the several ingredients simultaneously so that with these embodiments premixing of the several ingredients is not required and at the same time the several ingredients are simultaneously delivered in the desired proportions directly to the surface 7. Although in the embodiments shown in FIGS. 5 and 6 only two sets of distributor ducts have been shown so that only two ingredients would be supplied in this case, it is to be understood that any number of sets of distributor ducts may be provided to cooperate with a number of supply ducts corresponding to the number of sets of distributor ducts, so that in this way a separate supply duct cooperating with a separate set of distributor ducts may be provided for each of the ingredients. Thus, one of the ingredients such as ore may be supplied as indicated by the arrow 43 to one of the supply ducts so as to be delivered to one set of distributor ducts, while another material such as coke may be delivered as indicated by arrow 44 to the other of the supply ducts to be delivered to the other set of distributor ducts. When the rotary supply means 17 of FIG. 4 is not turning with respect to the rotary distributor means 13, the pair of outlet ends 45, 46 of the pair of supply ducts are respectively aligned with the inlet ends of one of the units formed by a pair of distributor ducts 41 and 48, so that with this arrangement there is a simultaneous delivery of ore and coke to the surface 7 along one of the annular areas described by the pair of discharge ends such as that which extends along the circle 54 shown in FIG. 5. The cross-sectional areas of the pair of distributor ducts 41 and 48 as well as each pair of ducts which forms a unit 51 of FIG. 6 have with respect to each other a ratio equal to that required for the ingredients, so that with embodiments such as that of FIGS. 5 or 6 there is provided an absolute guarantee of delivery of each of the ingredients in the required proportions to the surface 7 and thus throughout the entire height of the furnace. Moreover, an absolute continuity in the flow of the several ingredients is guaranteed with an embodiment as shown in FIG. 5 or FIG. 6 where a separate duct system is provided for each ingredient.

While the surface 7 of the material treated is indicated in FIGS. 1 and 4 as a plane, actually this surface is only substantially planar. It has in it some unevenness resulting from the successive delivery of the material to different portions of the surface 7 as described above. However, the extent of unevenness is maintained so small that it is not possible for the mixed ingredients to become dissociated from each other at the surface 7 due to the formation of inclined frustoconical surface areas down which the different ingredients might tumble so as to tend to become dissociated. The feeler elements referred to above are extremely simple and effectively maintain the variations in the height of the surface 7 at the different parts thereof so small that no dissociation of the elements of the mixture can take place. As a result, it is possible with this construction to locate the place where the discharge conduit means 5 communicates with the interior 8 at a relatively slight distance above the surface 7 with the discharge ends 39 of the several distributor ducts terminating slightly below the place where the conduit means 5 communicates with the interior 8 of the upper furnace portion 1, 4 so as to guarantee that none of the material delivered to the surface 7 will be drawn off through the discharge conduit means 5, 6. Thus, with this arrangement it is impossible for the material which is treated in the furnace to have any tendency to block the flow of the gas to the discharge conduit means 5, 6, and in this way it is possible to extend the surface 7 up to an elevation such as that shown in FIG. 1 located relatively close to the conduits 5 so that there is a substantial gain in the usable height of the furnace.

It will be understood that each of the elements described above, or two or more together, may also find a useful application in other types of shaft furnaces differing from the types described above.

While the invention has been illustrated and described as embodied in supply apparatus or shaft furnaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between said supply means and said upper furnace portion; and means supporting said rotary supply means and said rotary distributor means for rotation about said vertical axis relative to each other, said rotary distributor means including a plurality of distributor ducts which rotate with said rotary distributor means, which have inlet ends respectively distributed along said predetermined circle to receive material from said supply duct, and which respectively have above but relatively close to said plane a plurality of discharge means respectively located at different radial distances from said axis for discharging, during rotation of said rotary distributor means relative to said rotary supply means, material over an area substantially equal to said circular area.

2. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having an upper inlet end coaxial with said axis and a lower outlet end at a radial distance from said axis and describing, during rotation of said rotary supply means, a predetermined circle whose center is in said axis; rotary distributor means coaxial with and located between said supply and said upper furnace portion, said rotary distributor means including a plurality of distributor ducts which rotate with said rotary distributor means, which have inlet ends respectively distributed along said predetermined circle to receive material from the outlet end of said supply duct, and which have above but relatively close to said plane discharge ends respectively located at different radial distances from said axis and respectively having radial dimensions the total of which is substantially equal to the radius of said circular area, said discharge ends of said distributor ducts describing, during each revolution of said rotary distributor means, an area substantially equal to said circular area; and turning means operatively connected with said supply means for turning the latter in a stepwise manner through angular increments equal to the angular distances between said inlet ends of said distributor ducts so that said outlet end of said supply duct will communicate successively with said inlet ends of said distributor ducts.

3. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; and rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area, said discharge ends of said distributor ducts being arranged one next to the other along a single radial line extending from said axis.

4. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; and rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area, said discharge ends of said distributor ducts being angularly distributed about said axis.

5. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; and rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area, said distributor ducts being located about said axis in a common radial plane.

6. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area; a second set of distributor ducts respectively located next to said plurality of distributor ducts and carried by said rotary distributor means for rotation therewith, said second set of distributor ducts respectively having inlet and discharge ends located next to and at substantially the same elevation as the inlet and discharge ends of said plurality of distributor ducts; and a second supply duct located next to said first-mentioned supply duct and carried by said rotary supply means for rotation therewith, said inlet ends of said second set of distributor ducts being arranged along a circle of the same radius as that described by the lower outlet end of said second supply duct, whereby when two different materials are to be supplied to the shaft furnace one of the materials may be supplied through said first-mentioned supply duct and said plurality of distributor ducts while the second material may be supplied through said second supply duct and said second set of distributor ducts.

7. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area; a second set of distributor ducts respectively located next to said plurality of distributor ducts and carried by said rotary distributor means for rotation therewith, said second set of distributor ducts respectively having inlet and discharge ends located next to and at substantially the same elevation as the inlet and discharge ends of said plurality of distributor ducts; and a second supply duct located next to said first-mentioned supply duct and carried by said rotary supply means for rotation therewith, said inlet ends of said second set of distributor ducts being arranged along a circle of the same radius as that described by the lower outlet end of said second supply duct, whereby when two different materials are to be supplied to the shaft furnace one of the materials may be supplied through said first-mentioned supply duct and said plurality of distributor ducts while the second material may be supplied through said second supply duct and said second set of distributor ducts, the cross-sectional areas of said first-mentioned supply duct and said plurality of distributor ducts respectively having with respect to the cross-sectional areas of said second supply duct and said second set of distributor ducts a ratio substantially equal to the required ratio between the two materials to be supplied to the furnace to be treated therein.

8. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area; a second set of distributor ducts respectively located next to said plurality of distributor ducts and carried by said rotary distributor means for rotation therewith, said second set of distributor ducts respectively having inlet and discharge ends located next to and at substantially the same elevation as the inlet and discharge ends of said plurality of distributor ducts; and a second supply duct located next to said first-mentioned supply duct and carried by said rotary supply means for rotation therewith, said inlet ends of said second set of distributor ducts being arranged along a circle of the same radius as that described by the lower outlet end of said second supply duct, whereby when two different materials are to be supplied to the shaft furnace one of the materials may be supplied through said first-mentioned supply duct and said plurality of distributor ducts while the second material may be supplied through said second supply duct and said second set of distributor ducts, said first-mentioned supply duct and said second supply duct respectively having upper concentric inlet ends.

9. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between supply means and said upper furnace portion; and means supporting said rotary supply means and said rotary distributor means for rotation about said vertical axis relative to each other, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means relative to said rotary supply means, an area substantially equal to said circular area; and discharge conduit means communicating with the interior of said upper furnace portion at an elevation higher than said plane for discharging gas from said upper furnace portion, said discharge ends of said plurality of distributor ducts being located at an elevation lower than the elevation at which said discharge conduit means communicates with the interior of said upper furnace portion.

10. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area; turning means operatively connected with said supply means for turning the latter between said inlet ends of said distributor ducts so that said outlet end of said supply duct will communicate successively with said inlet ends of said distributor ducts; and means cooperating with said supply duct for preventing gas from escaping from the upper furnace portion through said supply duct to the exterior of the furnace while at the same time permitting materials to be supplied through said supply duct, said rotary supply means having a fluid-tight connection with said rotary distributor means and said rotary distributor means having a fluid-tight connection with said upper furnace portion.

11. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area; and means cooperating with said supply duct for preventing gas from escaping from the upper furnace portion through said supply duct to the exterior of the furnace while at the same time permitting materials to be supplied through said supply duct, said rotary supply means having a fluid-tight connection from said rotary distributor means and said rotary distributor means having a fluid-tight connection with said upper furnace portion, said means for preventing gas from escaping from said supply duct while permitting material to pass therethrough being in the form of a gas curtain extending across the interior of said supply duct.

12. In a shaft furnace, such as a blast furnace, lime kiln, or the like, in combination, an upper furnace portion having a vertical axis and having an inner predetermined circular area in a plane normal to said axis; rotary supply means coaxial with and located above said upper furnace portion and including a rotary supply duct having a lower outlet end describing, during rotation of said rotary supply means, a predetermined circle whose center is in said axis; rotary distributor means coaxial with and located between said supply means and said upper furnace portion, said rotary distributor means including a plurality of distributor ducts which rotate with said rotary distributor means, which have inlet ends respectively distributed along said predetermined circle to receive material from said supply duct, and which have above but relatively close to said plane discharge ends respectively located at different radial distances from said axis and each having a radial dimension substantially equal to the radius of said circular area divided by the number of said discharge ducts, said discharge ends of said distributor ducts describing, during each revolution of said rotary distributor means, an area substantially equal to said circular area; and means cooperating with said supply duct for preventing gas from escaping from the upper furnace portion through said supply duct to the exterior of the furnace while at the same time permitting materials to be supplied through said supply duct, said rotary supply means having a fluid-tight connection with said rotary distributor means and said rotary distributor means having a fluid-tight connection with said upper furnace portion, said means for preventing gas from escaping from said supply duct while permitting material to pass therethrough being in the form of a gas curtain extending across the interior of said supply duct, said supply duct having a portion of smaller cross-section than any other portion thereof and said gas curtain being located at said latter portion of said supply duct which is of smaller cross-section than any other portion thereof.

References Cited in the file of this patent
UNITED STATES PATENTS

| | | |
|---|---|---|
| 2,082,530 | Zeisloft et al. | June 1, 1937 |
| 2,654,594 | Somogyi | Oct. 6, 1953 |